US006556965B1

(12) United States Patent
Borland et al.

(10) Patent No.: US 6,556,965 B1
(45) Date of Patent: Apr. 29, 2003

(54) WIRED AND CORDLESS TELEPHONE SYSTEMS WITH EXTENDED FREQUENCY RANGE

(75) Inventors: David J. Borland, Austin, TX (US); Paul R. Teich, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/275,173

(22) Filed: Mar. 24, 1999

(51) Int. Cl.$^7$ .......................... G10L 21/00; H04M 1/725
(52) U.S. Cl. ..................... 704/200.1; 704/500; 455/426
(58) Field of Search .............................. 704/200.1, 500; 455/426

(56) References Cited

U.S. PATENT DOCUMENTS

| | | | |
|---|---|---|---|
| 5,784,572 A | * 7/1998 | Rostoker et al. | 709/247 |
| 5,920,834 A | * 7/1999 | Sih et al. | 704/233 |
| 6,020,916 A | * 2/2000 | Gerszberg et al. | 348/14.07 |

OTHER PUBLICATIONS

Fraunhofer Institut, "MPEG Audio Layer–3", p. 1–4, no date.*
"MPEG–FAQ 4.1: What is the Audio Layer 3 then?" downloaded from www.mpeg1.de on Jan. 27,1999.
Brandenburg et al., "Overview of MPEG Audio: Current and Future Standards for Low–Bit–Rate Audio Coding," J. Audio Eng. Soc., vol. 45, No. 1/2, Jan./Feb. 1997.
Brandenburg et al., "ISO–MPEG–1 Audio: A Generic Standard for Coding of High–Quality Digital Audio," J. Audio Eng. Soc., vol. 42, No. 10, Oct. 1994.

* cited by examiner

Primary Examiner—Tālivaldis Ivars Šmits
(74) Attorney, Agent, or Firm—Meyertons Hood Kivlin Kowert & Goetzel, P.C.; Jeffrey C. Hood

(57) ABSTRACT

A telephone that communicates high-quality audio signals and a method for communicating an audio signal with an extended frequency range over a telephone network. The cordless telephone has a handset unit with a sampler circuit, a compression circuit, decompression circuit, as well as analog-to-digital (A/D) and digital-to-analog (D/A) converters, which handset is coupled by an infrared (IR) wireless link to a base unit connected to the Public Switched Telephone Network (PSTN). In one embodiment, the telephone includes a sampler, a compression block, a telephone port, a decompression block, and a digital-to-analog (D/A) converter. The sampler receives a analog audio signal and digitizes the signal into a high-quality (705.6 kbps) digital audio signal. The compression block then encodes the digital audio signal into a compressed digital signal at a lower bit rate (such as 150 kbps or 56 kbps) with a compression algorithm such as MP3. The compressed digital signal is communicated through the telephone port to a telephone network. An incoming compressed digital signal is received from the telephone network by the telephone port and provided to the decompression block. From the received compressed digital signal, the decompression block reconstructs a digital audio signal at the high data rate. The D/A converter generates a reconstructed analog audio signal in response to the reconstructed digital audio signal.

13 Claims, 4 Drawing Sheets

WIRED AND CORDLESS TELEPHONE SYSTEMS WITH EXTENDED FREQUENCY RANGE

BACKGROUND OF THE INVENTION

1. Field of the Invention

The invention relates to electronic communication and, more particularly, to wired and cordless telephone systems.

2. Description of the Related Art

Telephone systems have evolved with the central goal of transmitting human-voice signals. Other goals have been added with the increasing capacities of telephone systems and the increasing demands of telephone users. A major change has been the rapid growth of digital telephone links for long-distance and local connections. With this growth has come the expectation of increased bandwidth on a telephone connection.

To transmit a voice signal or other analog signal through a digital link, the analog signal is digitized so that it can be represented by a stream of information symbols. Digitizing the audio signal involves sampling it so that values are recorded only at discrete points in time. Each sampled signal is subsequently quantized so that its amplitude is recorded as one of a discrete set of possible values. For human voice, the spectral power distribution has a bandwidth of approximately 3 kHz, so a sampling rate of 8000 samples/second (8 kS/s) records sufficiently many samples to reproduce the signal. With this sampling rate, 256 appropriately-chosen quantization levels (such as the logarithmically spaced A-law or $\mu$-law levels) are sufficient for producing a "toll-quality" digital audio signal.

Within the nominal 3 kHz bandwidth, the typical spectral power distribution of human voice is highly peaked in the 200–800 Hz frequency range, with diminishing amplitudes at higher frequencies. Since the power spectral density of a voice signal is not flat over the nominal 3 kHz frequency range, a digitized voice signal can be compressed and decompressed without much loss of fidelity. This compression may be performed in conjunction with the digitization, by using different forms of differential pulse code modulation (DPCM) such as delta modulation, "linear delta mod" (LDM), continuously variable slope delta modulation (CVSD), or various forms of adaptive differential pulse code modulation (ADPCM). Because of their reduced data rates, these coding schemes are commonly used in many communications systems for voice signals. These coding schemes and others are used in many implementations of telephone equipment. While these schemes work well for voice signals, they are not adequate for high quality audio signals. Indeed, many aspects of telephone equipment make standard telephones unsuitable for high quality audio. Even without the voice-oriented compression features (ADPCM, CVSD, etc.), regular telephones are not desirable for communicating clear audio over the audible frequency spectrum. The primary limitation comes from a systemic design consideration: each call is generally limited to a roughly 3 kHz bandwidth.

Telephone subscribers communicate via a vast telephone network, referred to as the Public Switched Telephone Network (PSTN). In the present disclosure, the terms "PSTN" and "telephone line" are intended to include the analog or POTS (Plain Old Telephone Service), PBX (Private Branch Exchange), ISDN (Integrated Services Digital Network), DSL (Digital Subscriber Line), and Wireless Local Loop (WLL), among others. In describing the methods and systems that apply to a "telephone," it is noted that these methods and systems can be used in a standard telephone, or in other telephone devices configured or adapted to communicate on these networks, such as personal computers and household appliances with remote-access functionality. A telephone subscriber's communications devices, e.g., telephones, are typically connected in parallel to a telephone line that links a subscriber's premises to a telephone service provider's central office (CO). The communications link is generally carried from the caller to the receiving party through one or more CO's. The links from caller to CO and from CO to receiving party are generally made over twisted-pair copper lines, which have a wide bandwidth (10 MHz–10 GHz). In a few situations therefore, a caller and a call recipient may communicate over a high-bandwidth channel. In general, however, the transmitted signal is filtered to have roughly a 3 kHz bandwidth adequate for most human-voice communication. This filtering, performed either at the CO or at a switching unit located near the caller, makes efficient use the PSTN's switching equipment and its multiplexed communications lines. The filtering is especially important in the case of telephone calls involving more than one CO, such as "long-distance" calls. In this case, the communications link between CO's is typically carried over digital communications channels, such as fiber-optic networks and satellite relays. The digital links are generally designed to accommodate only a 64 kbps data rate (=8 bits/Sample×8000 Samples/second) for each telephone call, which limits the bandwidth of the telephone signal to roughly 3 kHz. Since essentially all long distance and local voice-traffic calls are limited by the design of the PSTN to the 3 kHz bandwidth, telephone equipment is generally made with this design limitation as well. Thus, speakers, microphones, and circuitry in most telephones are generally optimized for the main frequency range of the human voice, nominally 30 Hz–3 kHz. This makes most telephone equipment unsuitable for transmission of high quality audio signals. CD-quality music, for example, with stereophonic channels and an approximate frequency range of 20 kHz, is transmitted poorly through telephone equipment.

Like regular wired telephones, cordless telephones generally limit the bandwidth of the audio signals they carry. Cordless telephones use either analog or digital links between a handset and a base unit. These units generally communicate through a wireless link such as a radio (although the signal may alternatively be transmitted through a free-space optical signal, a waveguide, or an optical fiber). In general, the voice data on a digital wireless link are compressed through techniques such as ADPCM or CVSD coding. The wireless link thus only needs to carry payload data at a reduced rate, typically 30%–60% less than the nominal 64 kbps rate.

SUMMARY OF THE INVENTION

Described herein is a telephone that communicates high-quality audio signals, such as "CD-quality" sound (sampled, for example, at 44.1 kHz with 16-bit resolution). In one embodiment, the telephone includes a sampler, a compression block, a telephone port, a decompression block, and a digital-to-analog (D/A) converter.

The sampler receives an analog audio signal (generated, for example, by a microphone or supplied through an audio port in the telephone) and digitizes the signal into a digital audio signal with a high bit rate (such as 44.1 kSamples/sec×16 bits/Sample=705.6 kbps) that permits the communication of high-quality audio. The compression block then encodes the digital audio signal into a compressed digital signal at a lower bit rate (such as 150 kbps or 56 kbps). The compressed digital signal is communicated through the telephone port to a telephone network.

An incoming compressed digital signal is received from the telephone network by the telephone port and provided to the decompression block. From the received compressed digital signal, the decompression block reconstructs a digital audio signal at the high data rate. The D/A converter generates a reconstructed analog audio signal in response to the reconstructed digital audio signal.

Also described herein is a method for communicating an audio signal with an extended frequency range over a telephone network. The method preferably includes steps of sampling the audio signal to generate a digitized signal, compressing the digitized signal with a compression algorithm, communicating the compressed signal over the telephone network, decompressing the compressed signal to generate a recovered digitized signal, and converting the recovered digitized signal to a recovered analog audio signal. The compression algorithm preferably includes psycho-acoustic perceptive coding and preferably generates an MPEG-audio data stream.

BRIEF DESCRIPTION OF THE DRAWINGS

Other objects and advantages of the invention will become apparent upon reading the following detailed description and upon reference to the accompanying drawings in which.

Figure 1:
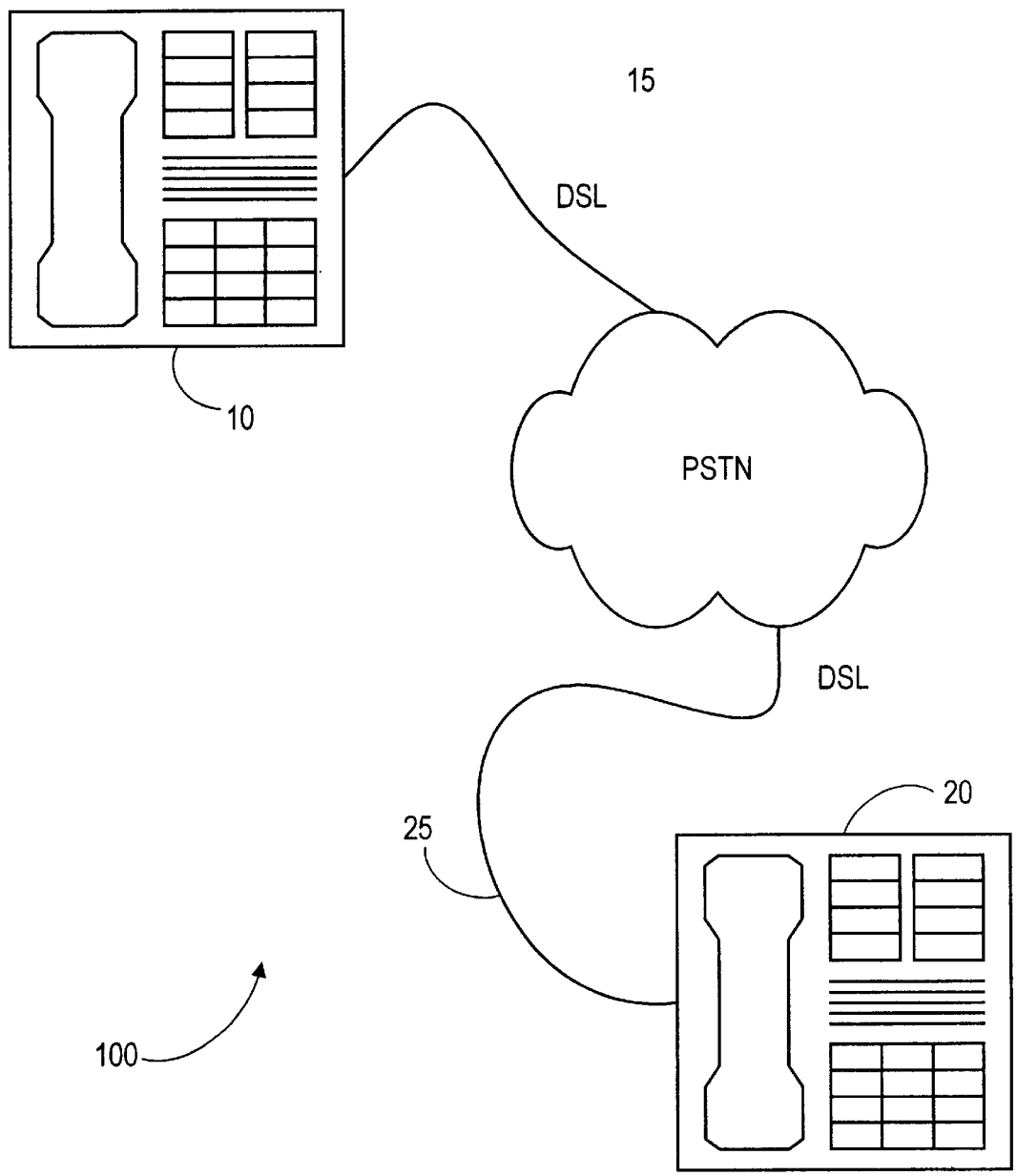
FIG. 1 is a representative view of a telephone system configured to communicate high-quality audio signals.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1: Telephone System with High-quality Audio

A representative digital communications system 100 suitable for communication of high-quality audio is shown in FIG. 1. The system includes two telephone units, 10 and 20, that are connected to the PSTN through telephone links 15 and 25, respectively. Telephone units 10 and 20 are configured with microphones, speakers, and other components suitable for transmitting audio signals throughout the audible range (nominally, 20 Hz–20 kHz). Telephone links 15 and 25 may be standard telephone lines, and are preferably digital links such as DSL lines, or cable-modem connections, capable of transmitting data at rates in excess of 96 kbps. This rate allows the communication of compressed audio with "near-CD" quality.

In one embodiment, telephone units 10 and 20 sample analog audio signals received from their respective microphones at CD rates and resolutions: 44,100 Samples/second (44.1 kS/s) and 16 bits/Sample. The sampled audio data are then compressed according to the MPEG Audio Layer 3 ("MP3") format, which typically provides a 8:1 to 14:1 compression ratio. The resulting compressed data stream has a bit rate of 50–90 kbps, and is communicated through telephone links 15 and 25 and the PSTN.

The quality of the communicated audio depends on three factors. The first of these is the encoder used to perform the compression in the telephone units. In general, compression protocols specify only the procedures followed by a decoder that reads the compressed data. The design of the encoder is largely left open, leaving room for advancements in the fidelity of the compression. This is especially important with encoders, such as most MP3 encoders, that employ "perceptual" coding. These systems take advantage of the fact that the human aural system is less sensitive to certain types of distortion than to others. Thus, the quality of the audio available in a particular compression format may advance with time as innovations are made in the design of the encoders.

Second, the data rate specified for the encoder may restrict the fidelity with which the encoder performs the compression. In general, when an encoder is restricted to generating an output with a low bit rate, it will produce a lower-fidelity compressed signal than when it is allowed to generate its output with a higher bit-rate. Commercially available MP3 encoders are generally used to compress CD-quality stereo music (dual-channel audio) from 1411.2 kbps (=2 channels× 44.1 kS/s×16 bits/Sample) to lower bit rates for storage in portable systems (e.g.: the Rio™ portable player by Diamond Multimedia) and for transmission through the Internet. Current encoders typically compress the CD stereo audio down to 150 kbps with negligible loss in perceived sound quality. These encoders may also be used to generate monaural compressed sound at lower rates of around 56 kbps; the resulting sound from current encoders, however, is generally considered to have a somewhat lower fidelity at these lower rates.

Third, the compression routines introduce a delay in the transmission of the audio signal. In general, the better compression routines require longer delays for encoding and decoding. A long delay, such as ½ second to several seconds, would generally be acceptable for music playback through communications system 100. However, for conversations, a delay in the system of greater than 10–100 ms may be considered a nuisance by a user.

Thus, several different embodiments of telephone units 10 and 20 may be implemented according to the data rate available through telephone links 15 and 25. If a high rate data link is available to a user, such as a megabit-per-second cable-modem line, telephone units 10 and 20 may communicate CD-quality stereo or monaural signals with little or no compression and little or no delay. In the case where the link is a DSL line with a bi-directional capacity of 96–500 kbps, the high quality audio may be communicated with a small delay by using MPEG Audio Layer 1, 2, or 3 compression. If the user is limited to standard telephone lines with a 56 kbps modem capacity, telephone units 10 and 20 may use MP3 compression to communicate a somewhat degraded audio signal with a substantial delay. In this case, the quality of the signal may be improved to some extent at the expense of an increased delay. However, the communicated signal should in most cases be substantially clearer than the "toll-quality" uncompressed voice signal available through regular telephony.

Figure 2:
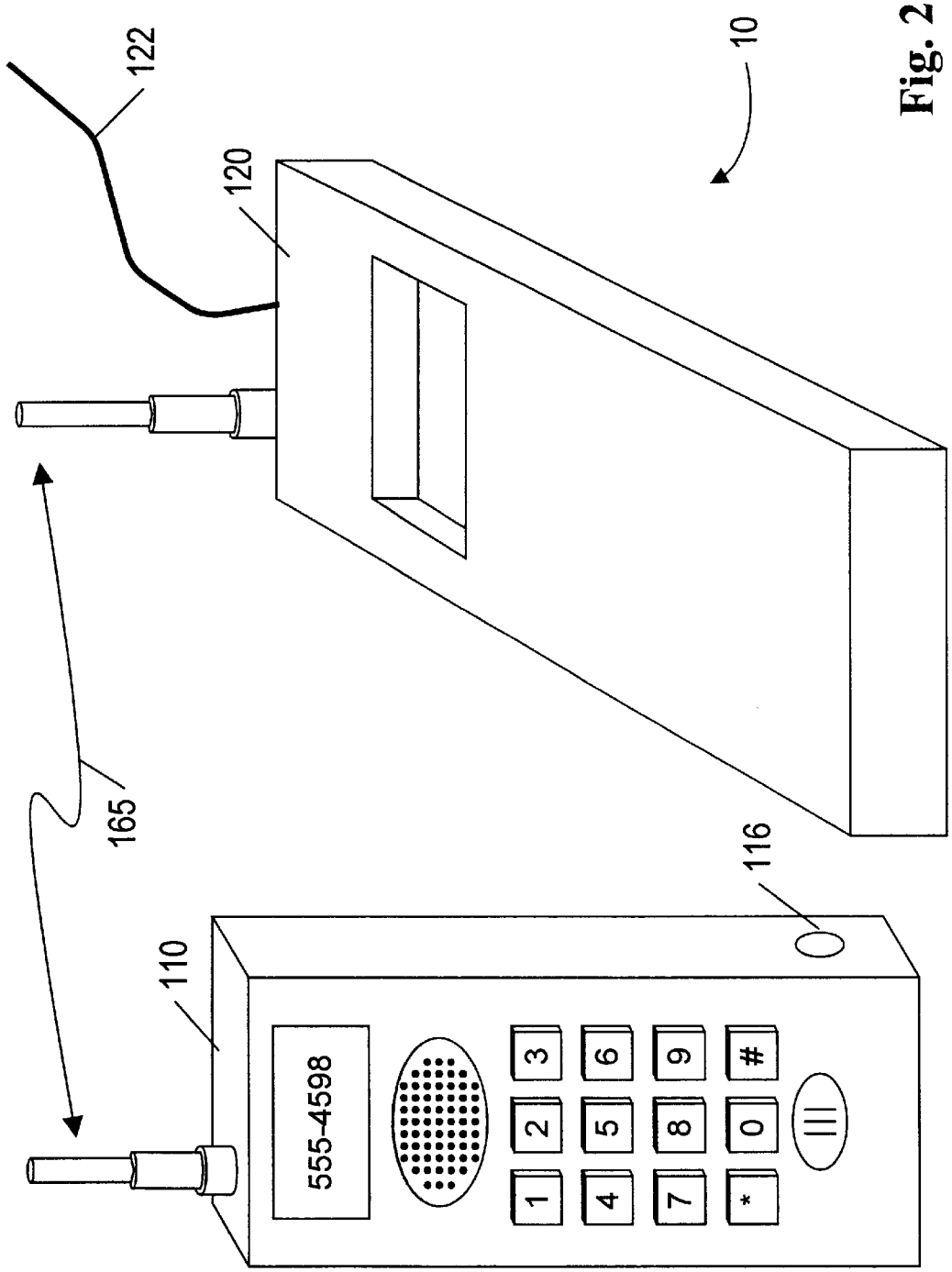
FIG. 2 shows one embodiment of a telephone from FIG. 1.

FIG. 2: Digital Communication System

A representative telephone unit 10 is shown in FIG. 2 as a cordless telephone system. In other embodiments, telephone unit 10 may be a different type of telephone system, such as a wired telephone or a mobile telephone, among others. Cordless telephone system 10 includes a handset transceiver 110 and a base unit transceiver 120 that communicate through a wireless digital link 165. The system's audio components are all designed to communicate signals throughout the audible frequency range of 20 Hz–20 kHz.

Handset 110 and base unit 120 each comprise a transmitter and receiver for wireless digital signals communicated on wireless digital link 165. Base unit 120 receives an incoming telephone signal from telephone connection 122 and transmits information from the incoming telephone signal to handset 110 as an incoming wireless digital signal. Handset 110 is a portable unit that re-creates an incoming audio signal from the incoming wireless digital signal. In the opposite direction, handset 110 generates an outgoing wireless digital signal in response to an outgoing audio signal. Base unit 120 receives the outgoing wireless digital signal and converts it to an outgoing telephone signal for telephone connection 122.

In one embodiment, handset transceiver 110 and base unit transceiver 120 also communicate with other transceiver units (not shown). Handset 110 communicates acoustic signals through a microphone and a speaker. As an alternative to the microphone and speaker, an audio port 116 on handset 110 may be used to directly receive electronic audio signals.

Figure 3:
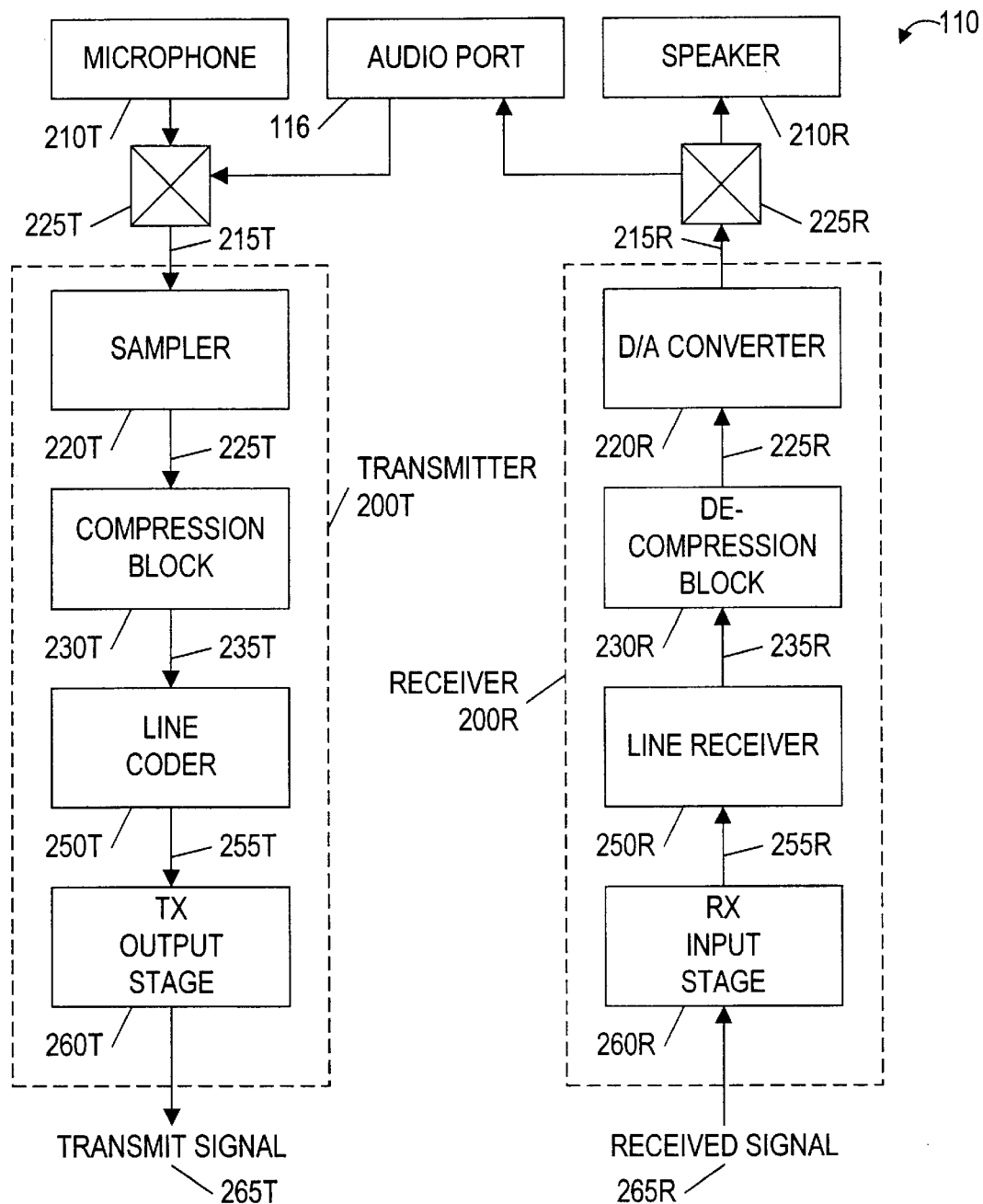
FIG. 3 is a block diagram of a handset transceiver from the cordless telephone in FIG. 2.

FIG. 3: Handset Transceiver—Block Diagram

FIG. 3 is a block diagram of handset transceiver 110. A transmitter 200T receives an analog transmit audio signal 215T from a microphone 210T or from audio port 116, and converts transmit audio signal 215T to an RF transmit signal 265T. A receiver 200R performs the inverse of this process: it receives an RF received signal 265R and processes received signal 265R to generate a received analog audio signal 215R. The received audio signal 215R is provided either to speaker 210R or to audio port 116. RF transmit and receive signals 265T and 265R are communicated to base unit transceiver 120 through wireless digital link 165 (from FIG. 2).

Transmit audio signal 215T is preferably an analog signal with frequency components in the range 20 Hz–20 kHz. Thus, transmit audio signal 215T is well suited for carrying high-quality audio signals as well as human voice. A selector 225T coupled to microphone 210T, audio port 116, and transmitter 200T determines whether audio signal 215T is received from microphone 210T or from audio port 116. Transmit audio signal 215T also includes any dialing signals such as rotary-dial interrupts or DTMF ("touch-tone") signals from a dialing unit (not shown). Another selector 225R coupled to speaker 210R, audio port 116, and receiver 200R determines whether received audio signal 215R is provided to speaker 210T or to audio port 116. Selectors 225T and 225R are preferably linked switches that act in conjunction to connect transmitter 200T and receiver 200R either to microphone 210T and speaker 210R or to audio port 116. The switching is preferably controlled by a detector (not shown) that determines if an external jack is connected to the audio port. In another embodiment, selectors 225T and 225R are switched by a user-actuated switch or pushbutton.

Transmit audio signal 215T is processed in transmitter 200T by several circuit blocks coupled in sequence: a sampler 220T, a compression block 230T, a line coder 250T, and an RF transmitter 260T.

The first block of the transmitter is sampler 220T, which samples transmit audio signal 215T to generate a digital signal 225T representing the audio signal. Sampler 220T is a lossless coder, that is, it digitizes transmit audio signal 215T and uses a coding scheme to generate a digital data stream 225T that completely describes the sampled signal, to within the limits of the digital sampling and quantization. In one embodiment, sampler 220T is a high-bandwidth PCM coder that generates 16-bit samples of transmit audio signal 215T at a 44.1 kHz sample rate so that digital data stream 225T is a 705.6 kbps digital signal of PCM (pulse-code modulation) bytes. The quantization levels used by sampler 220T for digitizing transmit audio signal 215T are preferably uniformly spaced (as in linear PCM). Alternatively, the levels may be logarithmically spaced (as in $\mu$-law or A-law PCM coding). In one embodiment, a user may switch between quantization schemes, providing flexibility for the transceiver to better communicate human voice or high-quality audio or certain types of modem signals.

Digital data stream 225T is sent to compression block 230T, which compresses the data to a reduced data rate. The design considerations of compression block include preservation of sound quality, maximization of the compression ratio, and minimization of the delay time as discussed earlier. These considerations are made in response to the available data rates on links 15 and 20 and the desired sound quality. In one embodiment, the compression is performed by an MP3 encoder that generates an output stream at approximately 150 kbps in response to an input stream of 16-bit samples at 44.1 kS/s. The resulting compressed signal 235T is then provided to a line coder 250T that maps the compressed data into analog waveforms appropriate for the selected modulation technique, thereby producing a line-coded baseband transmit signal 255T. The baseband signal 255T is provided to an output stage 260T. This output stage 260T is an RF transmitter in which baseband transmit signal 255T is upconverted to an RF transmit frequency, amplified, and radiated as transmit signal 265T. Transmit signal 265T may use amplitude-shift keying, frequency-shift keying, phase-shift keying, or combinations of these to convey the compressed data stream 235T. The implementation of line coder 250T and output stage 260T are designed in consideration of the modulation technique chosen for transmit signal 265T.

Receiver unit 200R comprises components that reverse the functions of the blocks in transmitter unit 200T. The input stage 260R is an RF receiver that receives received signal 265R and downconverts it to produce a baseband received signal 255R. A line receiver 250R samples and decodes the baseband received signal. The sampling is preferably done at a high sample rate, with the resulting digital data stream decimated to generate a received digital signal 235R with the same overall bit rate as the compressed data stream 235T. Received digital signal 235R is provided to a decompression block 230R, which decompresses the compressed data, thereby recovering a received digital data stream 225R. In one embodiment the decompressed data stream 225R is a stream of 16-bit PCM audio samples at 44.1 kS/s. Decompression block 230R provides digital data stream 225R to an analog-to-digital (A/D) converter 220R, which reconstructs received audio signal 215R from the digital audio signal 225R. In one embodiment, AID converter 220R is a PCM decoder.

In another embodiment, handset transceiver 110 is an infrared (IR) or other optical transceiver that communicates with other units by IR or visible-light signals transmitted either through open space or optical fibers. In this embodiment of the transceiver, transmitter output stage 260T is an optical source, such as an LED or a diode laser, that generates an optical transmit signal 265T modulated with the baseband transmit signal 255T. The optical modulation may be performed by binary on-off keying (OOK), amplitude-shift or frequency-shift keying, or phase-shift keying of a coherent optical signal. Receiver input stage 260R is an optical detector, such as a photodiode, that receives an optical receive signal 265R and in response generates an information-modulated baseband signal 255R that is sampled and decoded in line receiver 250R.

Figure 4:
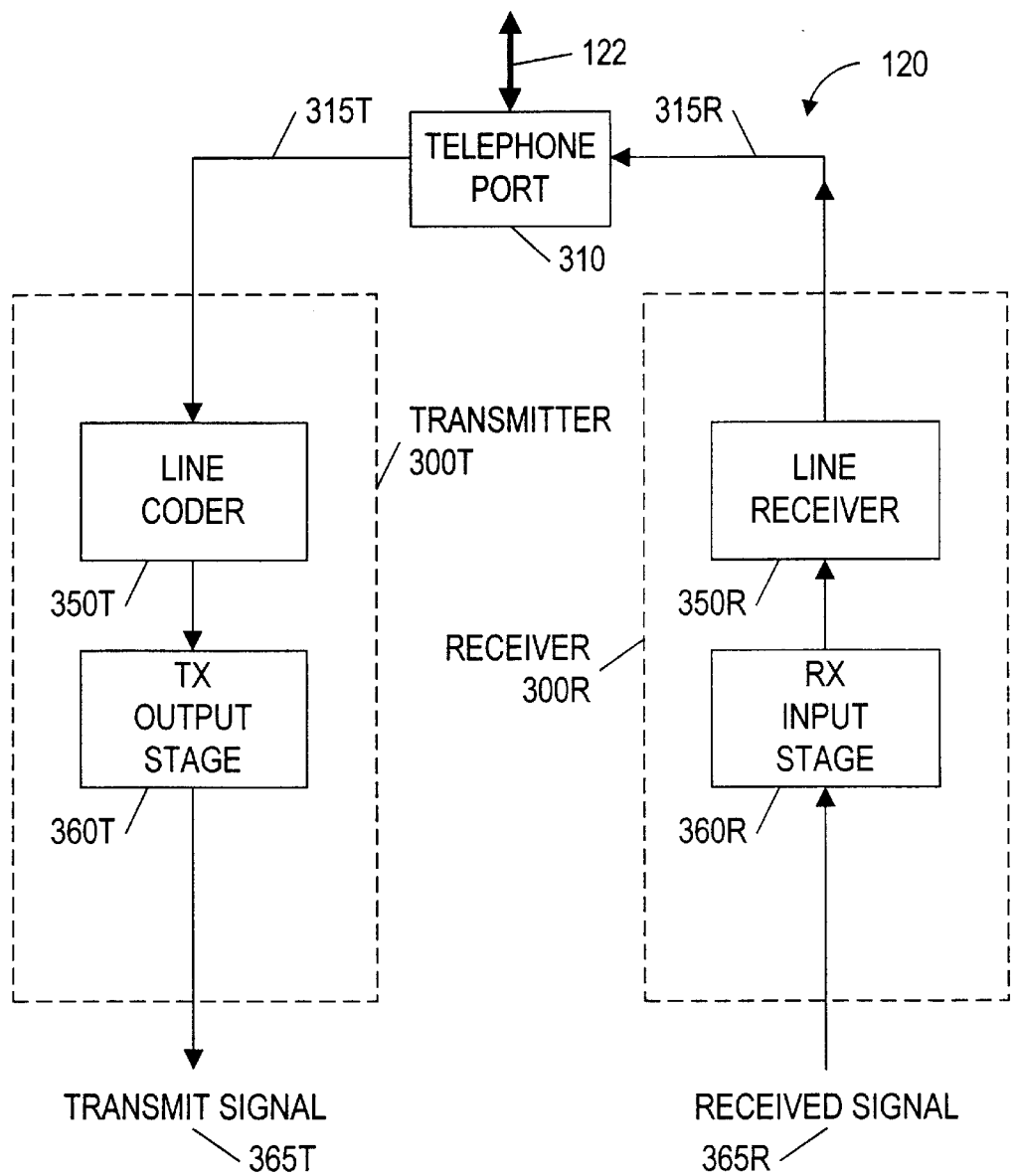
FIG. 4 is a block diagram of a base unit transceiver from the cordless telephone in FIG. 2.

FIG. 4: Base Unit—Block Diagram

FIG. 4 is a block diagram of one embodiment of base unit transceiver 120. Base unit transceiver 120 may include a transmitter 300T and a receiver 300R that function in a manner similar to that of handset transceiver 110 described above, except that instead of receiving and generating acoustic signals in a microphone and speaker, base unit transceiver 120 communicates on telephone connection 122.

Transmitter 300T receives an incoming telephone signal 315T from telephone connection 122 through a telephone port 310. Transmitter 300T converts incoming telephone signal 315T to an RF transmit signal 365T (which is received by handset 110 as signal 265R). Receiver 300R receives an RF received signal 365R (which is generated by handset 110 as signal 265T) and processes received signal 365R to generate an outgoing telephone signal 315R. Outgoing telephone signal 315R is provided to telephone connection 122 through telephone port 310. RF transmit and receive signals 365T and 365R are communicated to handset 110 through wireless digital link 165 (from FIG. 2). If telephone connection 122 is configured to carry a digital signal, telephone port 310 converts incoming and outgoing telephone signals 315T and 315R from and to the appropriate digital format.

Transmitter 300T may include a line coder 350T and an RF transmitter 360T that perform the same operations as the corresponding components of transmitter 200T in handset 110. Similarly, receiver 300R may include includes a line receiver 350R and a receiver input stage 360R that function in the same manner as the corresponding components of receiver 200R in handset 110.

Depending on design considerations, compression and decompression blocks 230T and 230R may be placed in base unit 120 rather than in handset 110. This alternative configuration allows a simplified design and reduced power consumption of the handset. The trade-off of this configuration is the requirement that wireless digital link 165 must be a higher-capacity channel capable of communicating at the data rate of the uncompressed digital data streams 225T and 225R.

In one embodiment, telephone port 310 is configured to receive an analog telephone signal, such as a POTS ("plain-old telephone service") or wireless local loop signal, from telephone connection 122. In other embodiments, the telephone signal from telephone connection 122 is a digital signal or is included in a digital signal. The digital signal may be a DSL, ADSL, HDSL, HDSL2, other xDSL, ISDN, or T1 signal, among others. Telephone port 310 may convert the digital signal, or an audio portion of the digital signal, to incoming telephone signal 315T, and to likewise convert outgoing telephone signal 315R into the appropriate digital format for telephone connection 122.

In another embodiment, telephone connection 122 is a dedicated computer line, such as an Ethernet line. Telephone port 310 in this configuration may extract a digital audio signal from data received on telephone connection 122 and to convert the digital audio signal into incoming telephone signal 315T. In this embodiment, telephone port 310 may be comprised in a separate conversion unit, such as a plug-in card for a home computer.

In yet another embodiment, telephone connection 122 is an analog or digital cellular telephone link, and telephone port 310 receives and transmits telephone signals 315T and 315R on the cellular link 122. Such a system may be particularly useful in an mobile communications setting.

One embodiment of this system is implemented in a personal computer that communicates through a modem. The individual block components, such as the compression and decompression blocks 230T and 230R, for example, may be implemented by software running on a CPU or on a dedicated processor on an add-in card. In this embodiment, the processing power is preferably used to carry out MP3 and DSL conversions.

What is claimed is:

1. A telephone for high-quality audio signals, the telephone comprising:

a sampler circuit configured to receive an analog audio signal and to digitize the analog audio signal, thereby generating a digital audio signal at a first data rate, and wherein the sampler circuit samples the analog audio signal at a rate of at least 44 kHz;

a compression circuit coupled to said sampler circuit wherein said compression circuit generates a compressed digital signal at a second data rate less than or equal to the first data rate in response to the digital audio signal;

a telephone port coupled to said compression circuit and configured to provide the compressed digital signal to a telephone line;

a decompression circuit coupled to said telephone port; wherein said decompression circuit is configured to receive a received compressed digital signal through said telephone port from the telephone line, and wherein said decompression circuit is configured to generate a reconstructed digital audio signal at the first data rate in response to the received compressed digital signal; and a digital-to-analog (D/A) converter coupled to said decompression circuit and configured to generate a reconstructed analog audio signal in response to the reconstructed digital audio signal;

wherein said sampler circuit, said compression circuit, said decompression circuit, and said D/A converter are comprised in a handset unit and wherein said telephone port is comprised in a base unit and wherein the handset unit and the base unit are coupled by a wireless link, wherein the wireless link is an infared (IR) link.

2. The telephone of claim 1, wherein the telephone is comprised in a personal computer.

3. The telephone of claim 1, wherein the telephone is comprised in an electronic appliance configured for remote access.

4. The telephone of claim 1, further comprising:

a microphone coupled to said sampler circuit and responsive to acoustic signals throughout an audible frequency range, wherein said microphone is configured to generate the analog audio signal in response to sounds incident on said microphone;

a speaker coupled to said D/A converter and capable of generating acoustic signals throughout the audible frequency range, wherein said speaker is configured to generate received sounds in response to the reconstructed analog audio signal.

5. The telephone of claim 4, wherein the audible frequency range is 20 Hz–20 kHz, and wherein said microphone and speaker have frequency responses over the audible frequency range.

6. The telephone of claim 1, wherein said sampler circuit is a PCM coder and wherein said D/A converter is a PCM decoder.

7. The telephone of claim 1, further comprising:

an audio port coupled to said sampler circuit and to said D/A converter, wherein said audio port is configured to receive the analog audio signal from an external audio source, and to provide the analog audio signal to said sampler circuit; and wherein said audio port is configured to receive the reconstructed analog audio signal from said D/A converter and to provide the reconstructed analog audio signal to an external audio device.

8. The telephone of claim 7, wherein said audio port is configured to provide the reconstructed analog audio signal to one or more of: an external speaker, an external audio player, and an external audio recorder.

9. The telephone of claim 1, wherein said handset unit further comprises:

a microphone coupled to said sampler circuit and responsive to acoustic signals throughout an audible frequency range, wherein said microphone is configured to generate the analog audio signal in response to sounds incident on said microphone;

a speaker coupled to said D/A converter and capable of generating acoustic signals throughout the audible frequency range, wherein said speaker is configured to generate received sounds in response to the reconstructed analog audio signal;

a line coder coupled to said compression circuit and configured to generate an uplink baseband signal carrying the compressed digital signal;

a transmitter coupled to said line coder and configured to modulate an uplink carrier with the uplink baseband signal and to transmit the modulated uplink carrier to said base unit;

a receiver configured to receive a modulated downlink carrier from said base unit and to demodulate the modulated downlink carrier into a downlink baseband signal, wherein the received compressed digital signal is encoded onto the modulated downlink carrier; and a line receiver coupled to said receiver and to said decompression circuit, wherein said line receiver is configured to recover the received compressed digital signal from the downlink baseband signal and to provide the received compressed digital signal to said decompression circuit.

10. The telephone of claim 1, wherein said base unit further comprises:

a line coder coupled to said telephone port and configured to receive the received compressed digital signal therefrom, wherein said line coder is configured to generate a downlink baseband signal carrying the received compressed digital signal;

a transmitter coupled to said line coder and configured to modulate a downlink carrier with the downlink baseband signal and to transmit the modulated downlink carrier to said handset unit;

a receiver configured to receive a modulated uplink carrier from said handset unit, wherein said modulated uplink carrier is encoded with the compressed digital signal, wherein the receiver is configured to demodulate the modulated uplink carrier into an uplink baseband signal; and a line receiver coupled to said receiver and to said telephone port, wherein said line receiver is configured to recover the compressed digital signal from the uplink baseband signal and to provide the compressed digital signal to said telephone port.

11. The telephone of claim 1, wherein said compression circuit is an MPEG audio encoder and wherein said decompression circuit is an MPEG audio decoder.

12. The telephone of claim 1, wherein said compression circuit is an MP3 audio encoder and wherein said decompression circuit is an MP3 audio decoder.

13. The telephone of claim 1, wherein the first data rate is 705.6 kbps and wherein the second data rate is less than 170 kbps.

* * * * *

UNITED STATES PATENT AND TRADEMARK OFFICE
CERTIFICATE OF CORRECTION

PATENT NO. : 6,556,965 B1
DATED : April 29, 2003
INVENTOR(S) : Borland et al.

It is certified that error appears in the above-identified patent and that said Letters Patent is hereby corrected as shown below:

<u>Title page, Item [54] and Column 1, lines 1-3,</u>
The correct title is as follows: -- CORDLESS INFRARED DIGITAL TELEPHONE COMMUNICATING NEAR-CD QUALITY CODED AUDIO SIGNALS OVER PUBLIC SWITCHED TELEPHONE NETWORK --.

Signed and Sealed this

Twenty-sixth Day of August, 2003

JAMES E. ROGAN
*Director of the United States Patent and Trademark Office*